United States Patent
Mei et al.

(10) Patent No.: US 10,374,998 B2
(45) Date of Patent: Aug. 6, 2019

(54) METHOD, APPARATUS AND SYSTEM FOR CUSTOMER SERVICE INFORMATION FORWARDING

(71) Applicant: TENCENT TECHNOLOGY (SHENZHEN) COMPANY LIMITED, Shenzhen (CN)

(72) Inventors: Shuhui Mei, Shenzhen (CN); Chengkang Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 164 days.

(21) Appl. No.: 15/100,628

(22) PCT Filed: Nov. 11, 2014

(86) PCT No.: PCT/CN2014/090844
§ 371 (c)(1),
(2) Date: May 31, 2016

(87) PCT Pub. No.: WO2015/078296
PCT Pub. Date: Jun. 4, 2015

(65) Prior Publication Data
US 2016/0308810 A1    Oct. 20, 2016

(30) Foreign Application Priority Data
Nov. 29, 2013 (CN) .......................... 2013 1 0632167

(51) Int. Cl.
*H04L 12/58* (2006.01)
(52) U.S. Cl.
CPC .............. *H04L 51/14* (2013.01); *H04L 51/38* (2013.01)
(58) Field of Classification Search
CPC ................................ H04L 51/14; H04L 51/38
(Continued)

(56) References Cited

U.S. PATENT DOCUMENTS

2002/0069048 A1* 6/2002 Sadhwani ............... G06F 17/28
                                                                       704/3
2006/0031334 A1* 2/2006 Kim ...................... H04L 51/066
                                                                       709/206
(Continued)

FOREIGN PATENT DOCUMENTS

| CN | 101931715 A | 12/2010 |
|---|---|---|
| CN | 103001941 A | 3/2013 |
| CN | 103139405 A | 6/2013 |

OTHER PUBLICATIONS

The World Intellectual Property Organization (WIPO) International Search Report for PCT/CN2014/090844 dated Feb. 27, 2015.

*Primary Examiner* — Nicholas R Taylor
*Assistant Examiner* — Meng Vang
(74) *Attorney, Agent, or Firm* — Anova Law Group, PLLC

(57) ABSTRACT

A customer service information forwarding method is provided. The method includes receiving customer service information sent by a client end terminal from a first communication platform to a first target account and, according to the first target account of the customer service information, obtaining a login status of a second target account on the second communication platform. The second target account is bound in advance to the first target account. The method also includes, when the second target account does not log in the second communication platform, obtaining a pre-established forwarding account bound to the second target account and setting the state of the customer service information as not-forwarded, and aggregating not-forwarded customer service information within a preset time period into a final aggregated customer service information and sending the final aggregated customer service information to the forwarding account through the first communication platform.

19 Claims, 8 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2007/0053334 A1* | 3/2007 | Sueyoshi | H04L 12/2856 370/338 |
| 2007/0197213 A1* | 8/2007 | Weintraub | H04M 3/545 455/433 |
| 2010/0124905 A1* | 5/2010 | Pratt | H04L 51/14 455/412.1 |
| 2010/0216495 A1* | 8/2010 | Kristiansson | H04L 51/04 455/466 |
| 2013/0326362 A1* | 12/2013 | Murray | G06Q 10/10 715/750 |

\* cited by examiner

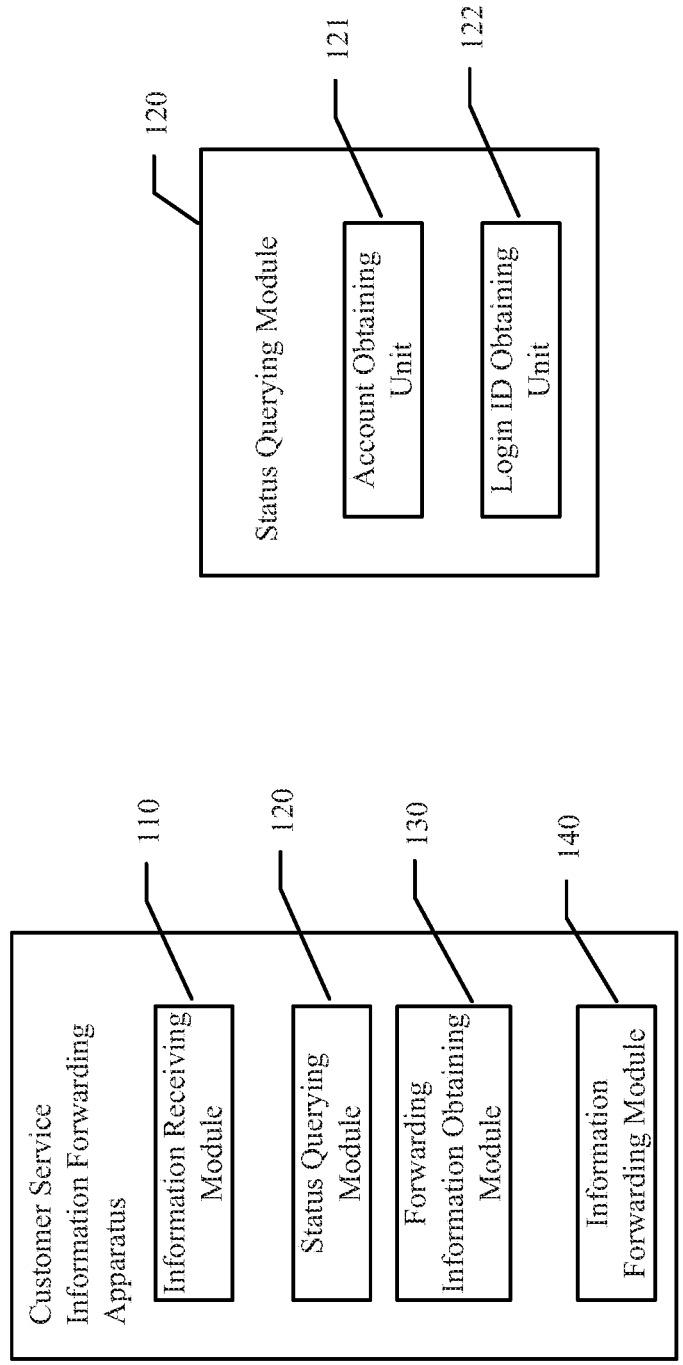

METHOD, APPARATUS AND SYSTEM FOR CUSTOMER SERVICE INFORMATION FORWARDING

CROSS-REFERENCES TO RELATED APPLICATIONS

This application claims priority of PCT Application No. PCT/CN2014/090844, filed on Nov. 11, 2014, which claims priority of Chinese Patent Application No. 201310632167.5, filed on Nov. 29, 2013. The entire content of the two applications is incorporated by reference herein.

FIELD OF THE INVENTION

The present invention generally relates to the field of computer technology and, more particularly, to a customer service information forwarding method, apparatus and system.

BACKGROUND

Today's chat software for customer service works either in one-to-many mode or in many-to-many mode between businesses and customers. Usually, the customer to business ratio is relatively high. For example, tens of thousands of customers are served and addressed by one or several customer service staffs. This requires high performance supporting system at the business end. So the customer service is generally received and served by customer service staffs though PCs installed with customer service software, and smart mobile terminals may not be able to support and manage simultaneously tens of thousands of users while processing a large number of messages. However, when the customer service staffs are not online, messages sent to PCs by the customers may not be able to be processed in time, failing to take advantage of the flexibility of smart mobile terminals to expand customer service software functionality.

The disclosed methods and structures are directed to solve one or more problems set forth above and other problems.

BRIEF SUMMARY OF THE DISCLOSURE

The disclosed embodiments of the present invention provide a customer service information forwarding method, apparatus and client-server system. The purpose of the present invention is to expand the customer service to mobile terminals.

One aspect of the present invention provides a customer service information forwarding method, the method includes receiving customer service information sent by a client end terminal from a first communication platform to a first target account and, according to the first target account of the customer service information, obtaining a login status of a second target account on the second communication platform. The second target account is bound in advance to the first target account. The method also includes, when the second target account does not log in the second communication platform, obtaining a pre-established forwarding account bound to the second target account and setting the state of the customer service information as not-forwarded, and aggregating not-forwarded customer service information within a preset time period into a final aggregated customer service information and sending the final aggregated customer service information to the forwarding account through the first communication platform.

Another aspect of the present invention provides a customer service information forwarding apparatus, the apparatus includes an information receiving module, a status querying module, a forwarding information obtaining module and an information forwarding module. The information receiving module is configured to receive a customer service information sent by a user through a first communication platform to a first target account. The status querying module is configured to obtain a login status of a second target account, which is bound in advance to the first target account, on a second communication platform based on the first target account of the customer service information. The forwarding information obtaining module is configured to obtain a pre-established forwarding account bound to the second target account and to set the state of the customer service information as not-forwarded when the second target account does not log in the second communication platform. The information forwarding module is configured to aggregate not-forwarded customer service information in a preset time period into a final aggregated customer service information and to send the final aggregated customer service information to the forwarding account through the first communication platform.

The present invention also provides a client-server system, the client-server system includes a first mobile terminal, a second mobile terminal, a PC terminal, a first communication platform and a second communication platform. The first mobile terminal and the second mobile terminal both communicate with the first communication platform, the PC terminal communicates with the second communication platform and the first communication platform exchanges information with the second communication platform. Further, the PC terminal receives customer service information sent by the first mobile terminal from the first communication platform to a first target account. According to the first target account of the customer service information, the first communication platform obtains a login status of a second target account on the second communication platform, wherein the second target account is bound in advance to the first target account. Further, when the second target account does not log in the second communication platform, the first communication platform obtains a pre-established forwarding account bound to the second target account and sets the state of the customer service information as not-forwarded. The first communication platform aggregates not-forwarded customer service information within a preset time period into a final aggregated customer service information and sends the final aggregated customer service information to the forwarding account on the second mobile terminal through the first communication platform.

Other aspects of the present disclosure can be understood by those skilled in the art in light of the description, the claims, and the drawings of the present disclosure.

BRIEF DESCRIPTION OF THE DRAWINGS

The accompanying drawings are used to illustrate more clearly the embodiments of the present invention. Obviously, the drawings illustrate certain embodiments of the present invention. Those ordinary skilled in the art may obtain other drawings based on these disclosed drawings without creative efforts. And those drawings are also under the protection of the present invention.

FIG. 6 illustrates a schematic functional block diagram of a customer service information forwarding apparatus according to disclosed embodiments of the present invention;

FIG. 7 illustrates a schematic functional block diagram of a status querying module of a customer service information forwarding apparatus according to disclosed embodiments of the present invention;

DETAILED DESCRIPTION

The followings, together with accompanying drawings and examples, further describe the embodiments of the present invention. It should be understood that the embodiments of the present invention described herein are merely to illustrate the invention and are not intended to limit the present invention.

The disclosed embodiments may be applied to forward customer service information. The customer service information refers to a communication information for customer service transported through a communication network. The communication information may include texts, images or videos, etc. Because a customer service system needs to process a large number of customer service information, the customer service information are mainly processed through PC terminals. But with the development of mobile terminal technology, more and more people want to communicate the customer service information through mobile terminals.

Figure 1:
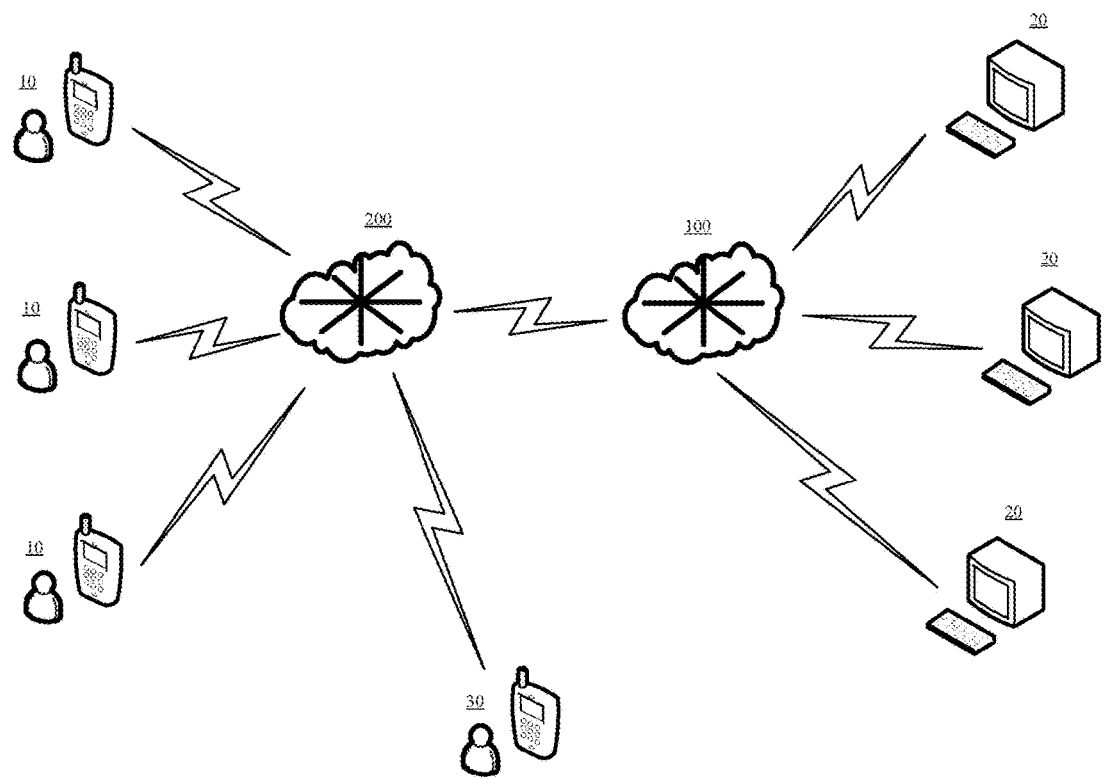
FIG. 1 illustrates a schematic structure diagram of a customer service system according to disclosed embodiments of the present invention.

FIG. 1 illustrates a schematic structure diagram of a customer service information system according to disclosed embodiments of the present invention. As shown in FIG. 1, the customer service system includes a first communication platform 100, a second communication platform 200, one or more first mobile terminals 10, one or more PCs 20, and a second mobile terminal 30. The PC 20 may include any appropriate PC or PCs, and the first mobile terminal 10 and the second mobile terminal 30 may include any appropriate mobile terminal or mobile terminals, such as mobile phones, table tablets and PDAs, etc.

The first communication platform 100 may interact and exchange information with the second communication platform 200. The first communication platform 100 and the second communication platform 200 may be a platform built on a server, or on a group of servers, or may further be built on servers in the cloud (i.e. cloud servers). The first communication platform 100 may provide access for the first mobile terminal 10 and the second mobile terminal 30. And the second communication platform 200 may provide access for the PC 20.

At the beginning, the PC terminal 20 registers a target account (i.e. a second target account) on the second communication platform 200, the PC terminal 20 also registers another target account (i.e. a first target account) on the first communication platform 100, and the two target accounts can be bound together. Through a binding relationship, the PC terminal 20 may interact and exchange information with the first mobile terminal 10 via the first communication platform 100 and the second communication platform 200.

For example, the PC terminal 20 may communicate with the first mobile terminal 10 in the following way. After the first mobile terminal 10 sends customer service information via the first communication platform 100 to the first target account, the first communication platform 100 according to the binding relationship forwards the customer service information to the second target account on the second communication platform 200 corresponding to the first target account. The second communication platform 200 then sends the customer service information to the corresponding PC terminal 20. On the opposite direction, after the PC terminal 20 sends the customer service information via the second communication platform 200 to the second target account, the second communication platform 200 according to the binding relationship forwards the customer service information to the first target account on the first communication platform 100 corresponding to the second target account. The first communication platform 100 then sends the customer service information to the corresponding first mobile terminal 10.

Next, the second mobile terminal 30 also registers a forwarding account on the first communication platform 100, and the forwarding account is bound with the second target account. Through the binding relationship, the information sent to the first target account may also be sent to the corresponding forwarding account. For example, after receiving the customer service information from the first mobile terminal 10, the first communication platform 100 obtains a login status of the second target account on the second communication platform 200 based on the binding relationship. And if the second target account is not online on the second communication platform 200, the customer service information is sent to the forwarding account.

Figure 9:
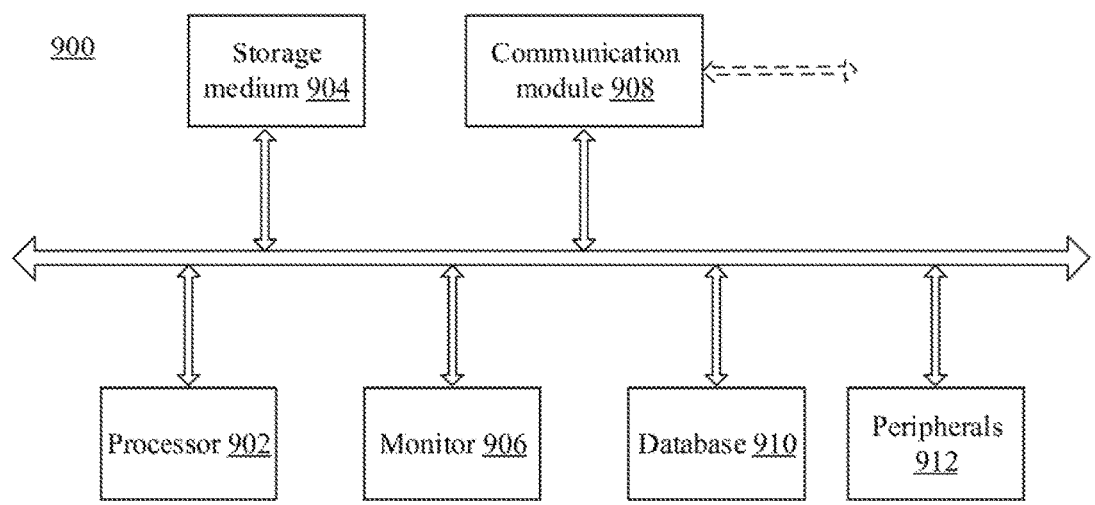
FIG. 9 illustrates a block diagram of an exemplary computing system for forwarding customer service information according to disclosed embodiments of the present invention.

Further, the various terminals, PCs, or servers (e.g., the first mobile terminal 10 and the second mobile terminal 30) may be implemented on a computing system for customer service information forwarding as shown in FIG. 9. FIG. 9 shows a block diagram of an exemplary computing system 900 for forwarding customer service information according to disclosed embodiments of the present invention.

As shown in FIG. 9, computing system 900 may include a processor 902, a storage medium 904, a monitor 906, a communication module 908, a database 910, and peripherals 912. Certain devices may be omitted and other devices may be included.

Processor 902 may include any appropriate processor or processors. Further, processor 902 can include multiple cores for multi-thread or parallel processing. Storage medium 904 may include memory modules, such as ROM, RAM, flash memory modules, and erasable and rewritable memory, and mass storages, such as CD-ROM, U-disk, and hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network. Database 910 may include one or more databases for storing certain data and for performing certain operations on the stored data, such as database searching.

Figure 2:
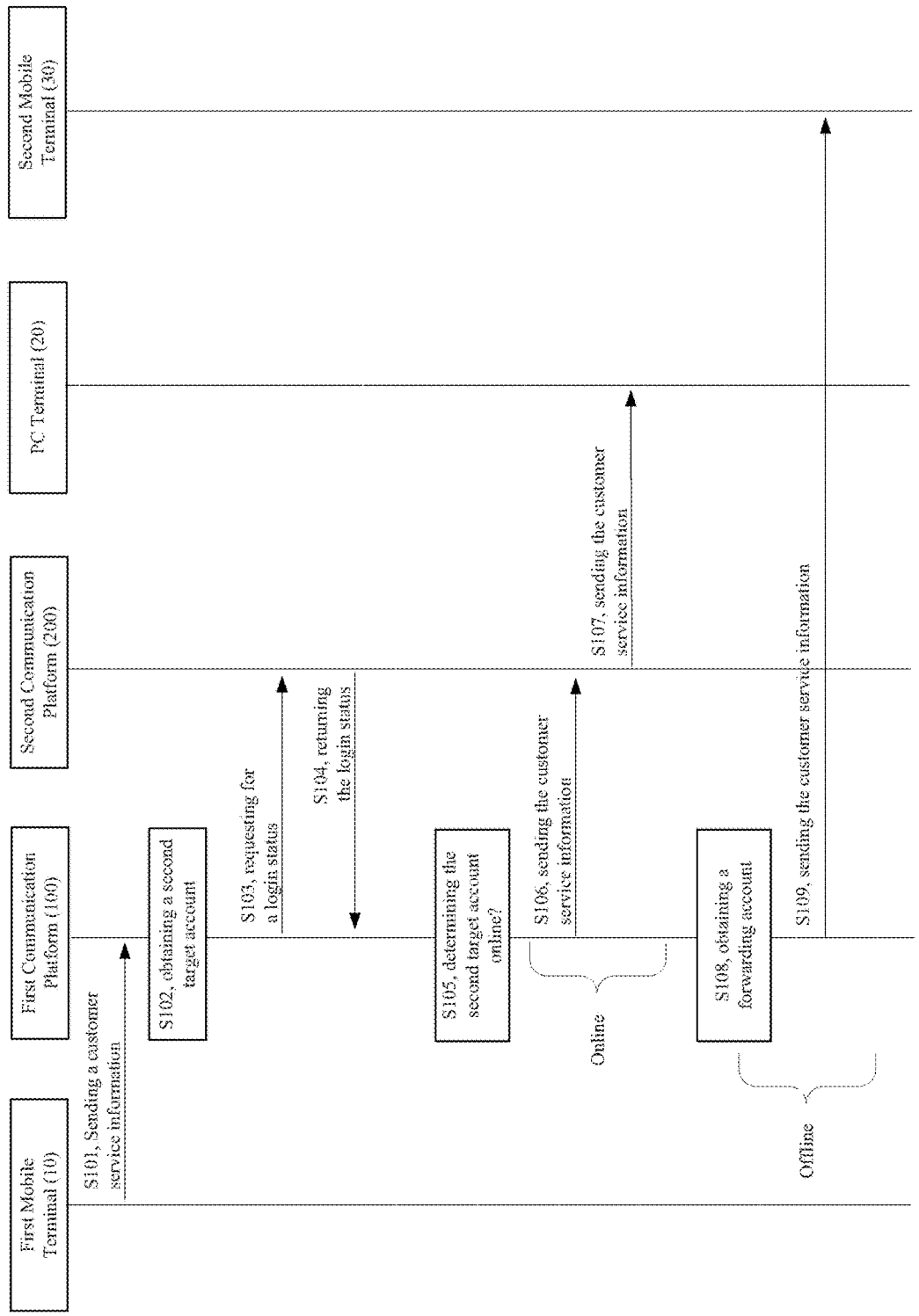
FIG. 2 illustrates a flow chart of a customer service information forwarding method according to disclosed embodiments of the present invention.

FIG. 2 illustrates a flow chart of a customer service information forwarding method according to disclosed embodiments of the present invention. As shown in FIG. 2, the customer service information forwarding method includes the following steps.

STEP S101, a first mobile terminal 10 sends a customer service information to a first communication platform 100.

STEP S102, after the first communication platform 100 receives the customer service information from the first mobile terminal 10, the first communication platform 100 according to a preset binding relationship of a target account obtains a second target account of the customer service information corresponding to a first target account.

STEP S103, the first communication platform 100 sends a request to a second communication platform 200 to check a login status of the second target account.

STEP S104, the second communication platform 200, after querying the login status of the second target account, returns the login status to the first communication platform 100.

When a PC terminal 20 registers the second target account in the second communication platform 200, a login ID is generated. When the PC terminal 20 successfully logs in the second communication platform 200, the login ID is displayed as "online" status. And when the PC terminal 20 does not log in or fails to log in the second communication platform 200, the login ID is displayed as "offline". Thus, the second communication platform 200, after querying the login ID of the second target account, returns the login status to the first communication platform 100. It should be understood that the PC terminal 20 may not only refer to a terminal, but also may refer to a collection of multiple terminals, i.e. the second target account corresponds to multiple terminals.

Each terminal corresponds to a second target account with a customer service sub-number. When any terminal logs in successfully to the second communication platform 200, the login ID will be displayed as "online" status, otherwise the login ID will be displayed as "offline". Of course, a user may also be able to set the status of the login ID. For example, when the user does not want the second target account to be in "offline" and the received customer service information is to be sent to the forwarding account, the user may set the login ID as always "online". That is, even when all the corresponding customer service sub-numbers of the second target account are in offline status, a login ID of a main number of the customer service information is still online, because of the forwarding account.

STEP S105, the first communication platform 100 determines whether the second target account is online. If the second target account is online, the process proceeds to STEP S106. Otherwise if the second target account is not online, the process proceeds to STEP S108.

That is, when the first communication platform 100 receives the login ID, the first communication platform 100 determines whether the second target account is online.

STEP S106, the first communication platform 100 sends the customer service information to the second communication platform 200.

When the second target account logs in the second communication platform 200, the first communication platform 100 sends the customer service information to the second communication platform 200, and the destination address of the customer service information is the second target account. It should be understood that, if an information format supported by the first communication platform 100 is different from the information format supported by the second communication platform 200, before sending the customer service information, the first communication platform 100 converts the format of the customer service information into the information format supported by the second communication platform 200.

STEP S107, the second communication platform 200 sends the customer service information to the corresponding PC terminal 20 based on second target account.

If the second target account corresponds to multiple PC terminal 20, the second communication platform 200 sends the customer service information to the multiple PC terminal 20 according to a preset rule or in a random order. The preset rule may be a chosen sort order of the customer service sub-number.

STEP S108, a forwarding account bound to the second target account is obtained.

When the second target account does not log in the second communication platform 200, the first communication platform 100 obtains the preset forwarding account bound to the second target account.

STEP S109, based on the forwarding account, the customer service information is sent to a corresponding second mobile terminal 30.

The first communication platform 100 forwards the customer service information to the second mobile terminal 30. Due to the large amount of customer service information, if the first communication platform 100 forwards each received message to the second mobile terminal 30, it may increase the burden on the second mobile terminal 30 and the first communication platform 100. Therefore, according to the disclosed embodiments, the first communication platform 100 first aggregates the customer service information in a not-forwarded state within a preset time period to obtain an aggregated customer service information, then the first communication platform 100 sends the aggregated customer service information to the second mobile terminal 30 based on the forwarding account. It should be understood that, when the first communication platform 100 forwards the customer information to the second mobile terminal 30, the first communication platform 100 may also sends the customer service information to the second target account in the second communication platform 200.

According to the disclosed embodiments, the aggregated customer information is a news type of information. The news type of information is an aggregation of link-type information, including a number of messages and each message may include four elements: title, abstract, image, link.

The message has the following format:

| Title | Abstract | Image | Link |

Figure 10:
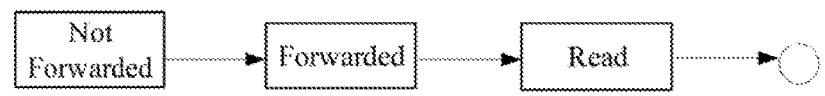
FIG. 10 illustrates a block diagram of exemplary states of customer service information according to disclosed embodiments of the present invention.

The above customer service information may, as shown in FIG. 10, also have three states: "not-forwarded", "forwarded", and "read". After the customer service information is received, the customer service information is set to state "not-forwarded". The customer service information in "not-forwarded" state is polled in a regular time interval. After the customer service information are aggregated into the news type of information, the aggregated customer service information is sent to the forwarding account and the customer service information is set to state "forwarded".

After a user (e.g., a seller) reads the sent message, a read identification is returned, and according to the read identification the state of the customer service information is set to "read".

All received customer service information are recorded and form a message forwarding table:

| Second target account | First target account | Message Type | Message Content | Received Date | Message State |
|---|---|---|---|---|---|
| 2857471846 | Test | Text | Welcome | 2013.01.01 | Not-Forwarded |
| 2857471846 | Test | Image | (image link) | 2013.01.01 | Forwarded |
| 2857471846 | Test | Video | (video link) | 2013.01.01 | Read |
| ... | ... | ... | ... | ... | ... |

Further, for forwarding, a timer may be set, the first communication platform may poll every minute to check whether there is any customer service information needed to be forwarded. For each second target account, if the number of the customer service information received in one minute is less than N (e.g. N=4), the customer service information are aggregated and the aggregated customer service information is then forwarded to the forwarding account. Otherwise if the number of the customer service information received in one minute is more than N, then a message indication, such as "too many messages, please process at a PC terminal", is sent to the forwarding account. The user may be prompted with such message and proceed to the PC terminal for processing the customer service information.

Thus, according to the disclosed embodiments, it may be first determined whether the second target account of the customer service information is online when a customer service information is received. And if the second target account of the customer service information is offline, the forwarding account bound to the second target account is obtained and the customer service information is sent to the forwarding account after aggregating the customer service information. Thus, the cross-platform customer service information exchange can be conducted between the PC and the mobile terminal and improve the scalability of the customer service type of software with the help of other communication platforms.

Figure 3:
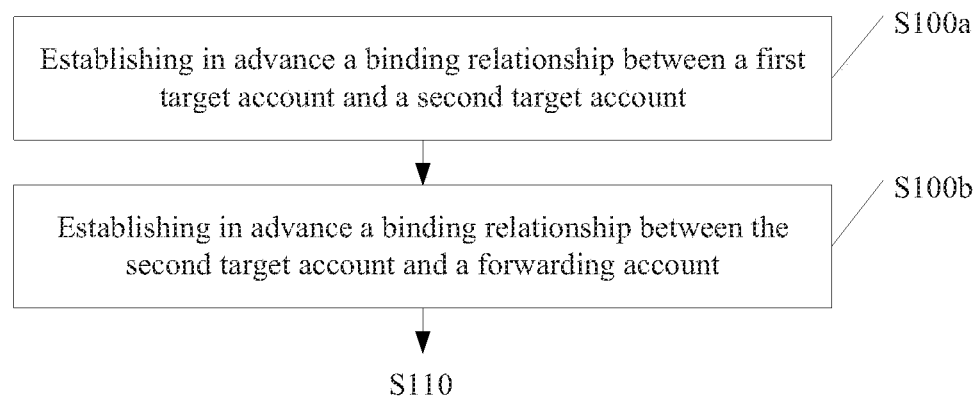
FIG. 3 illustrates a flow chart of another customer service information forwarding method according to disclosed embodiments of the present invention.

Further, before STEP S101 described in FIG. 2, the disclosed customer service information forwarding method further includes the following steps as shown in FIG. 3.

STEP S100a, a binding relationship between the first target account and the second target account is established in advance.

First, the PC terminal 20 registers respectively the first target account in the first communication platform 100 and the second target account in the second communication platform 200. Then the PC terminal 20 establishes the binding relationship between the first target account and the second target account.

STEP S100b, a binding relationship between the second target account and the forwarding account is established in advance.

First, the second mobile terminal 30 registers a forwarding account in the first communication platform 100, then establishes the binding relationship between the second target account and the forwarding account.

Figure 4:
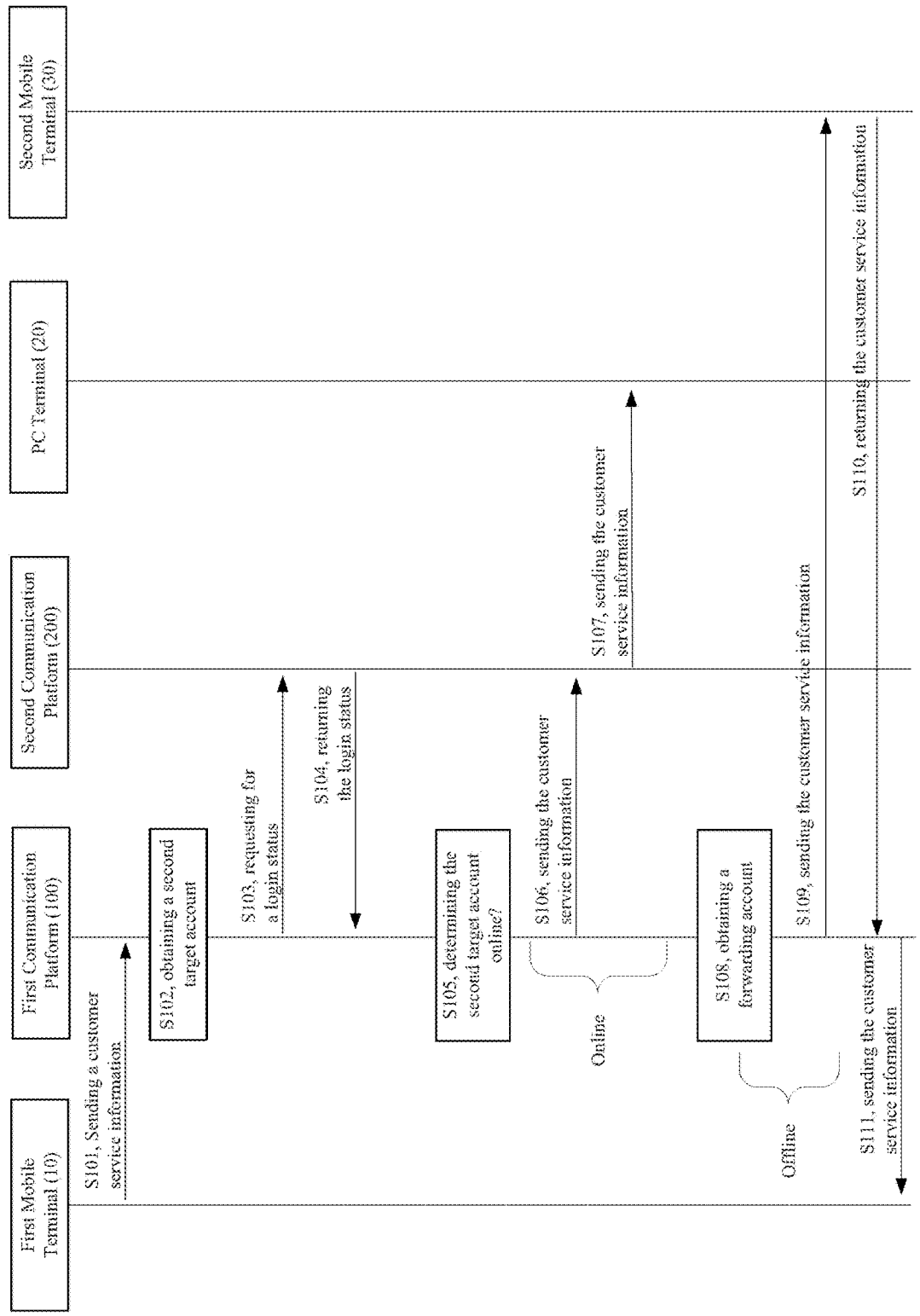
FIG. 4 illustrates a flow chart of another customer service information forwarding method according to disclosed embodiments of the present invention.

FIG. 4 illustrates a flow chart of another customer service information forwarding method according to disclosed embodiments of the present invention. As shown in FIG. 4, the disclosed method, after STEP S109 described in FIG. 2, further includes the following steps.

STEP S110, the second mobile terminal 30 returns a response message.

STEP S111, the first communication platform 100 receives the response message sent by the forwarding account and sends the response message according to a destination address of the response message to a corresponding client (e.g., first mobile terminal 10).

Figure 5:
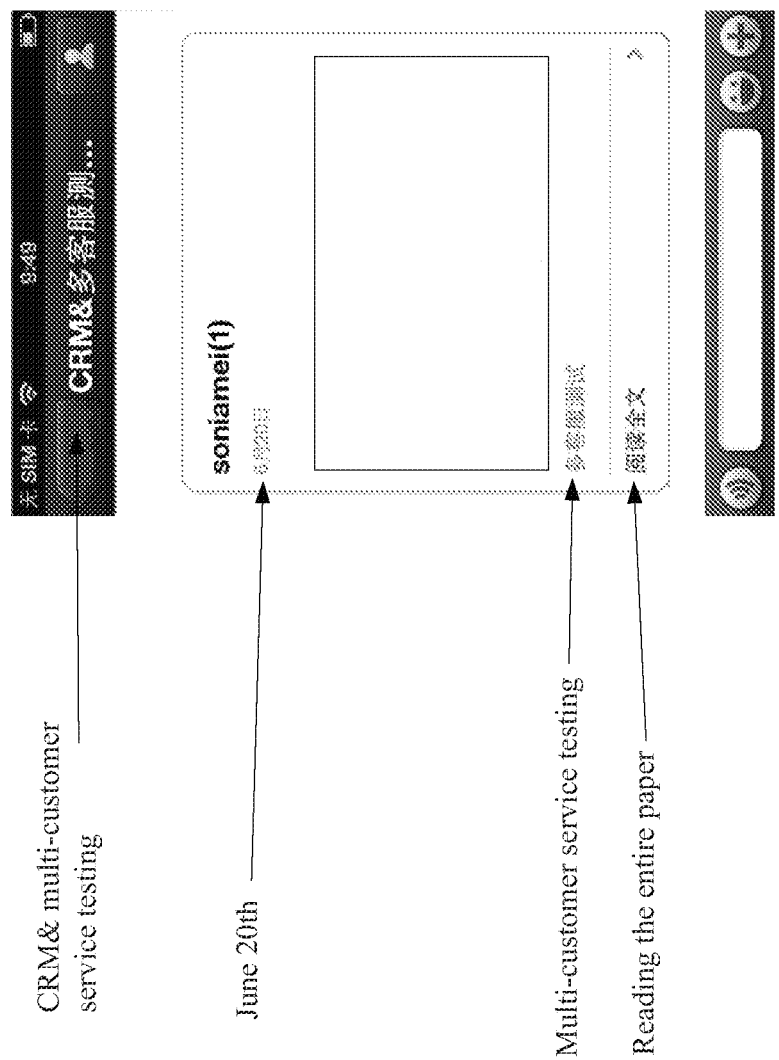
FIG. 5 illustrates an exemplary display of an aggregated customer service information forwarded by a first communication platform and received by a mobile terminal according to disclosed embodiments of the present invention.

When the forwarding account receives an aggregated information forwarded from the first communication platform 100, a message as shown in FIG. 5 is displayed on a terminal where the forwarding account is located. Since the aggregated information provides link-type information, a user may click on a link to jump to a reply page. After the link is clicked on, based on the link address, a HTML5 page shows up for the second mobile terminal 30 to compile a response message. The response message includes the destination address to which the response message needs to be sent. After the response message returned by the forwarding account is received, the first communication platform 100 sends the response message to the corresponding client, which is the first mobile terminal 10. Specifically, the first communication platform 100 according to the destination address of the response message sends the response message to the corresponding first mobile terminal 10.

It should be understood that the first communication platform 100 also sends the response message to the corresponding first mobile terminal 10 based on the destination address of the response message when the first communication platform 100 receives the response message sent by the second target account.

Through information aggregation, the disclosed embodiments of the present invention may jump to a corresponding chat interface through a link address after receiving the aggregated information to reply the customer service information in a timely manner, thus improves the processing efficiency of customer service software.

Corresponding to the above method embodiments, the present invention further provides a customer service information forwarding apparatus. FIG. 6 illustrates a schematic functional block diagram of a customer service information forwarding apparatus according to disclosed embodiments of the present invention.

As shown in FIG. 6, the customer service information forwarding apparatus includes an information receiving module 110, a status querying module 120, a forwarding information obtaining module 130, and an information forwarding module 140.

The information receiving module 110 is configured to receive a customer service information sent by a client end terminal via a first communication platform to a first target account.

The status query module 120 is configured to obtain a login status of a second target account, which is bound to the first target account in advance, in a second communication platform.

The forwarding information obtaining module 130 is configured to obtain a preset forwarding account bound to the second target account, and to set the state of the customer service information as not-forwarded when the second target account does not log in the second communication platform.

The information forwarding module 140 is configured to aggregate all the customer service information in state "not-forwarded" within a preset time period to obtain a final aggregated customer service information and to send the final aggregated customer service information to the forwarding account via the first communication platform.

The information receiving module 110 receives the customer service information sent by a first mobile terminal 10 via the first communication platform 100 to the first target account. The status querying module 120 according to a binding relationship between the first target account and a second target account obtains the login status of the second target account in a second communication platform 200. When the second target account in the second communication platform is offline, the forwarding information obtaining module 130 obtains the forwarding account bound to the second target account and forwards the customer service information to a corresponding second mobile terminal 30 of the forwarding account.

Specifically, the forwarding information obtaining module 130 set the state of the to-be-forwarded customer service information as online. The information forwarding module 140, after aggregating the customer service information within the preset time period, sends the aggregated customer service information to the second mobile terminal 30. When the second target account in the second communication platform is online, the customer service information is sent to the second target account in the second communication platform 200 and the second communication platform 200 sends the customer service information to a PC terminal 20 corresponding to the second target account.

Thus, according to the disclosed embodiments, when receiving the customer service information, it can be first determined whether the second target account of the customer service information is online. When the second target account of the customer service information is offline, the forwarding account bound to the second target account is obtained, the customer service information is aggregated and the aggregated customer service information is sent to the forwarding account. Thus, cross-platform customer service information exchange can be conducted between the PC terminal and the mobile terminal, improving the scalability of the customer service type of software with the help of other communication platforms.

Further, as shown in FIG. 7, the status querying module 120 may further includes an account obtaining unit 121 and a login ID obtaining unit 122.

The account obtaining unit 121 is configured to obtain the first target account of the customer service information and according to the first target account to obtain the second target account bound in advance to the first target account.

The login ID obtaining unit 122 is configured to obtain a login ID of the second target account in the second communication platform and based on the login ID to determine a login status of the second target account in the second communication platform.

When the PC terminal 20 registers the second target account in the second communication platform 200, the login ID is generated. When the PC terminal 20 successfully logs in the second communication platform 200, the login ID is displayed as "online" status. Otherwise, when the PC terminal 20 fails to log in the second communication platform 200, the login ID is displayed as "offline" status. The second communication platform 200 queries the login ID of the second target account and returns the login ID to the first communication platform 100. The first communication platform 100 determines the login status of the second target account in the second communication platform 200 based on the login ID.

It should be understood that the PC terminal 20 refers not only to a terminal, may also refer to a collection composed of multiple terminals, i.e. a second target account corresponds to multiple terminals. Each terminal corresponds to a second target account with its own customer service sub-number. When any terminal logs in successfully the second communication platform 200, its login ID is displayed as "online" status. Otherwise the login ID is displayed as "offline" status. Of course, a user can also set the status of the login ID. For example, when the user does not want the second target account to be offline and the received customer service information needs to be forwarded to the forwarding account, the user can set the login ID as "always online". That is, when all the corresponding customer service sub-numbers of the second target account are in offline status, the login ID of the target main number of the customer service information is still online.

Figure 8:
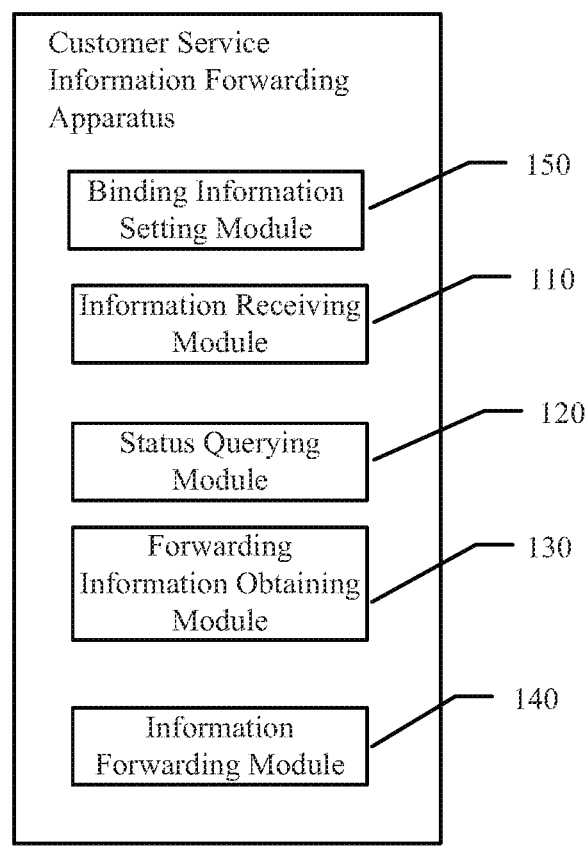
FIG. 8 illustrates a schematic functional block diagram of a status querying module of another customer service information forwarding apparatus according to disclosed embodiments of the present invention.

Further, referring to FIG. 8, the customer service information apparatus further includes a binding information setting module 150.

The binding information setting module 150 is configured to establish in advance a binding relationship between the first target account and the second target account and to establish in advance a binding relationship between the second target account and the forwarding account.

First, the PC terminal 20 registers respectively the first target account in the first communication platform 100 and the second target account in the second communication platform 200, the second mobile terminal 30 registers the forwarding account in the first communication platform 100. Then, the binding information setting module 150 establishes the binding relationship between the first target account and the second target account and establishes the binding relationship between the second target account and the forwarding account.

In addition, the information receiving module 110 is further configured to receive a response message sent by the forwarding account.

The information forwarding module 140 is further configured to send the response message to the corresponding client end terminal via the first communication platform according to the destination address of the response message.

When the second mobile terminal 30 receives the aggregated information forwarded by a multi-service platform, a message as shown in FIG. 5 is displayed on the mobile terminal where the forwarding account is located. Since the aggregated information provides link-type information, a user may click on a link to jump to a reply page. After the link is clicked on, based on the link address, a HTML5 page shows up for the second mobile terminal 30 to reply a message. The response message includes the destination address to which the response message needs to be sent. After the information receiving module 110 receives the response message returned by the forwarding account, the information receiving module 110 sends the response message to the corresponding client end terminal, which is the first mobile terminal 10. Specifically, the first communication platform 100 according to the destination address of the response message sends the response message to the corresponding first mobile terminal 10.

It should be understood that the first communication platform 100 also sends the response message to the corresponding first mobile terminal 10 according to the destination address of the response message when the first communication platform 100 receives the response message sent by the second target account.

Thus, according to the disclosed embodiments of the present invention, through information aggregation, the user may jump to a corresponding chat interface through a link address after receiving the aggregated information to reply the customer service information in a timely manner, improving the processing efficiency of customer service software.

The above describes certain embodiments of the present invention, but the scope of the present invention is not limited thereto, and those skilled in the art may easily think of variations, changes, modifications or replacements of the present invention within the disclosed technical scope. Any of those variations, changes, modifications or replacements should fall within the protection scope of the present invention. Accordingly, the scope of the present invention should be the scope of the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed customer service information forwarding methods and apparatus can be used in a variety of customer service systems. Using the disclosed methods and apparatus, when receiving the customer service information, it can be first determined whether the second target account of the customer service information is online. When the second target account of the customer service information is offline, the forwarding account bound to the second target account can be obtained, the customer service information can be aggregated and the aggregated customer service information can be sent to the forwarding account. Thus, cross-platform customer service information exchange can be conducted between the PC terminal and the mobile terminal and improve the scalability of the customer service type of software with the help of other communication platforms.

What is claimed is:

1. A customer service information forwarding method, comprising:
   receiving, by a first communication platform, customer service information sent by a client end terminal to a first target account, wherein the first communication platform provides access to the first target account for a plurality of mobile terminals;
   when the client end terminal sends the customer service information via the first communication platform to the first target account, forwarding, by the first communication platform, the customer service information to a second target account on a second communication platform;
   according to the first target account of the customer service information, obtaining, by the second communication platform, a login status of the second target account, wherein the second target account is bound in advance to the first target account, and the second communication platform provides access to the second target account for at least one personal computer (PC);
   when the second target account is logged into the second communication platform by a corresponding PC of the at least one PC, sending, by the second communication platform, the customer service information to the corresponding PC;
   when the second target account on the at least one PC does not log in the second communication platform, obtaining, by the first communication platform, a pre-established forwarding account bound to the second target account and setting the state of the customer service information as not-forwarded; and
   aggregating, by the first communication platform, not-forwarded customer service information within a preset time period into a final aggregated customer service information and sending the final aggregated customer service information to the forwarding account through the first communication platform;
   wherein the method further comprises:
   determining whether a number of the final aggregated customer service information within the preset time period exceeds a predefined value, and
   when the number of the final aggregated customer service information within the preset time period exceeds the predefined value, sending, by the first communication platform, a message to the forwarding account to prompt a user to check the final aggregated customer service information at the at least one PC.

2. The customer service information forwarding method according to claim 1, wherein, according to the first target account of the customer service information, obtaining, by the second communication platform, the login status of the second target account includes:
   obtaining the first target account of the customer service information;
   according to the first target account, obtaining the second target account bound in advance to the first target account; and
   obtaining a login identity (ID) of the second target account on the second communication platform and determining the login status of the second target account on the second communication platform based on the login ID.

3. The customer service information forwarding method according to claim 2, wherein, the login ID is set based on the login status of a customer service sub-number corresponding to the second target account of the customer service information, or the login ID is set by the user.

4. The customer service information forwarding method according to claim 1, wherein, before receiving, by the first communication platform, the customer service information sent by the client end terminal, the method further comprises:
   establishing in advance a binding relationship between the first target account and the second target account; and
   establishing in advance a binding relationship between the second target account and the forwarding account.

5. The customer service information forwarding method according to claim 1, wherein, after sending the final aggregated customer service information to the forwarding account through the first communication platform, the method further includes:
   receiving a reply message sent by the forwarding account; and based on a destination address of the reply message, sending the reply message to the corresponding client end terminal through the first communication platform.

6. The customer service information forwarding method according to claim 1, wherein when a first information format supported by the first communication platform is different from a second information format supported by the second communication platform, before forwarding the customer service information, the first communication platform further converts the first information format of the customer service information into the second information format supported by the second communication platform.

7. The customer service information forwarding method according to claim 1, wherein the final aggregated customer service information is an aggregation of link-type information, including a number of messages and each message includes a title, an abstract, an image and a link.

8. The customer service information forwarding method according to claim 1, wherein the customer service information is set to a state selected from: a not-forwarded state, a forwarded state and a read state.

9. The customer service information forwarding method according to claim 8, further comprising:
 setting the customer service information to the not-forwarded state, when the customer service information is received by the first communication platform;
 setting the customer service information to the forwarded state, after the final aggregated customer service information is sent to the forwarding account through the first communication platform; and
 setting the customer service information to the read state, when a read identification is returned after the user reads the final aggregated customer service information.

10. A customer service information forwarding apparatus, includes:
 a memory; and
 a processor coupled to the memory, wherein the processor is configured to:
 receive a customer service information sent by a client end terminal through a first communication platform to a first target account, wherein the first communication platform provides access to the first target account for a plurality of mobile terminals;
 when the client end terminal sends the customer service information via the first communication platform to the first target account, forward the customer service information to a second target account on a second communication platform;
 obtain a login status of the second target account bound in advance to the first target account on the second communication platform based on the first target account of the customer service information, wherein the second communication platform provides access to the second target account for at least one personal computer (PC);
 when the second target account is logged into the second communication platform by a corresponding PC of the at least one PC, send the customer service information to the corresponding PC;
 obtain a pre-established forwarding account bound to the second target account and set a state of the customer service information as not-forwarded when the second target account does not log in the second communication platform; and
 aggregate not-forwarded customer service information within a preset time period into a final aggregated customer service information and to send the final aggregated customer service information to the forwarding account through the first communication platform;
 wherein the processor is further configured to:
 determine whether a number of the final aggregated customer service information within the preset time period exceeds a predefined value, and
 when the number of the final aggregated customer service information within the preset time period exceeds the predefined value, send, by the first communication platform, a message to the forwarding account to prompt a user to check the final aggregated customer service information at the at least one PC.

11. The customer service information forwarding apparatus according to claim 10, wherein, the processor is further configured to:
 obtain the first target account of the customer service information and to obtain the second target account bound in advance to the first target account based on the first target account; and
 obtain a login identity (ID) of the second target account on the second communication platform and to determine the login status of the second target account on the second communication platform based on the login ID.

12. The customer service information forwarding apparatus according to claim 11, wherein, the login ID is set according to the login status of a customer service sub-number corresponding to the second target account of the customer service information, or the login ID is set by the user.

13. The customer service information forwarding apparatus according to claim 10, wherein the processor is further configured to:
 establish in advance a binding relationship between the first target account and the second target account and establish in advance a binding relationship between the second target account and the forwarding account.

14. The customer service information forwarding apparatus according to claim 10, wherein the processor is further configured to receive a reply message sent by the forwarding account and send the reply message from the first communication platform to the corresponding client end based on a destination address of the reply message.

15. A client-server system, comprising a first mobile terminal, a second mobile terminal, a personal computer (PC) terminal, a first communication platform and a second communication platform, wherein:
 the first mobile terminal and the second mobile terminal both communicate with the first communication platform, the PC terminal communicates with the second communication platform and the first communication platform exchanges information with the second communication platform, the first communication platform provides access to a first target account for the first mobile terminal and the second mobile terminal, and the second communication platform provides access to a second target account for the PC terminal;
 the PC terminal receives customer service information sent by the first mobile terminal from the first communication platform to the first target account;
 when the first mobile terminal sends the customer service information via the first communication platform to the first target account, the first communication platform forwards the customer service information to the second target account on the second communication platform;

according to the first target account of the customer service information, the first communication platform obtains a login status of the second target account on the second communication platform, wherein the second target account is bound in advance to the first target account;

when the second target account is logged into the second communication platform by a corresponding PC of the at least one PC, the second communication platform sends the customer service information to the corresponding PC terminal;

when the second target account does not log in the second communication platform, the first communication platform obtains a pre-established forwarding account bound to the second target account and sets the state of the customer service information as not-forwarded; and the first communication platform aggregates not-forwarded customer service information within a preset time period into a final aggregated customer service information and sends the final aggregated customer service information to the forwarding account on the second mobile terminal through the first communication platform;

wherein the first communication platform further:

determines whether a number of the final aggregated customer service information within the preset time period exceeds a predefined value, and when the number of the final aggregated customer service information within the preset time period exceeds the predefined value, sends a message to the forwarding account to prompt a user to check the final aggregated customer service information at the PC terminal.

16. The client-server system according to claim 15, wherein
the first communication platform is further configured to:
obtain the first target account of the customer service information;
according to the first target account, obtain the second target account bound in advance to the first target account; and
obtain a login identity (ID) of the second target account on the second communication platform and determine the login status of the second target account on the second communication platform based on the login ID.

17. The client-server system according to claim 16, wherein, the login ID is set based on the login status of a customer service sub-number corresponding to the second target account of the customer service information, or the login ID is set by the user.

18. The client-server system according to claim 15, wherein:
the PC terminal establishes in advance a binding relationship between the first target account and the second target account; and
the second mobile terminal establishes in advance a binding relationship between the second target account and the forwarding account.

19. The client-server system according to claim 15, wherein the first communication platform is further configured to:
receive a reply message sent by the forwarding account; and
based on a destination address of the reply message, send the reply message to the first mobile terminal.

* * * * *